Oct. 2, 1928.
C. P. HOEFLER
1,686,452
HEADLIGHT
Original Filed Sept. 20, 1926    3 Sheets-Sheet 3
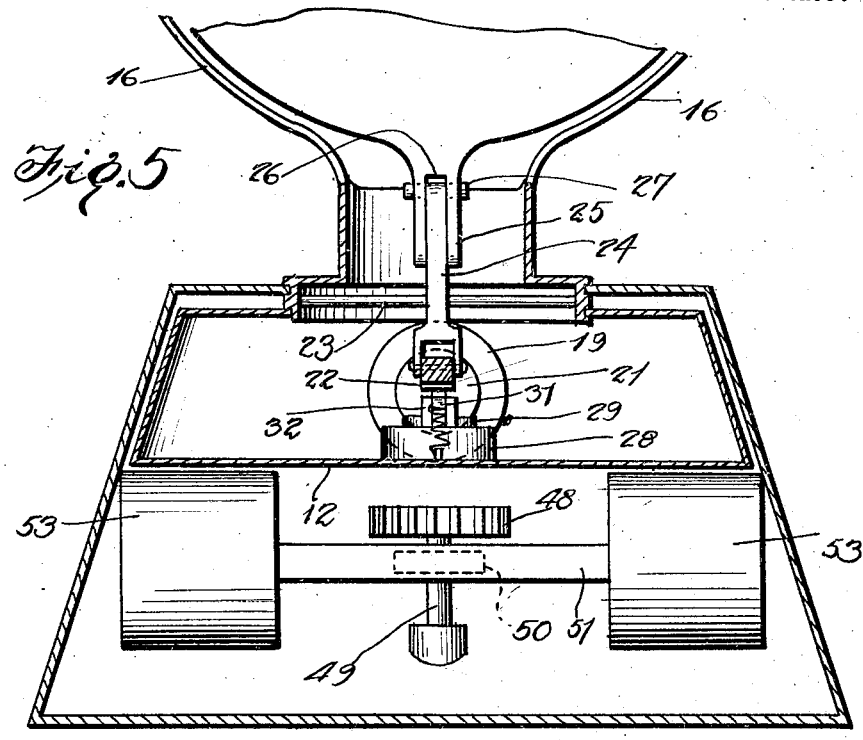
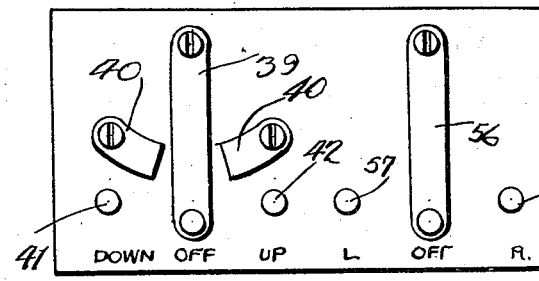
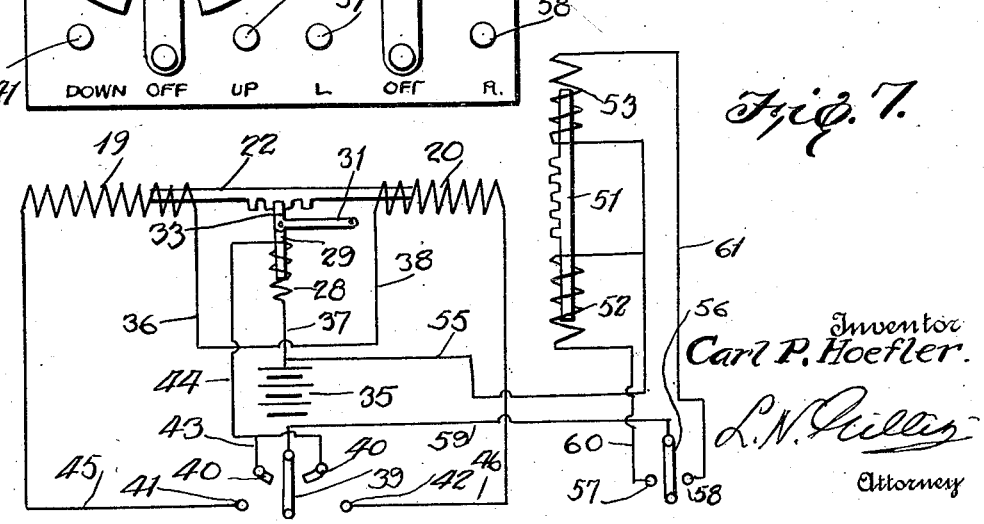
Inventor
Carl P. Hoefler.
L. N. Gillis
Attorney Patented Oct. 2, 1928.

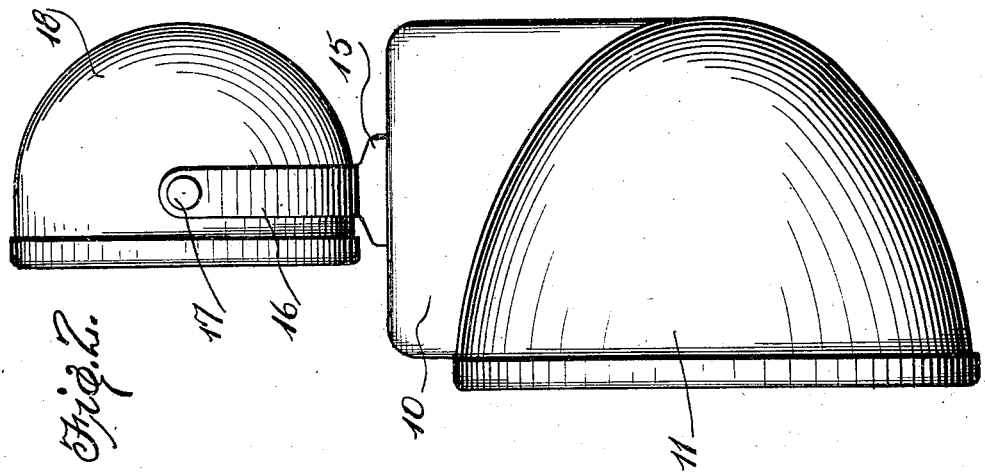
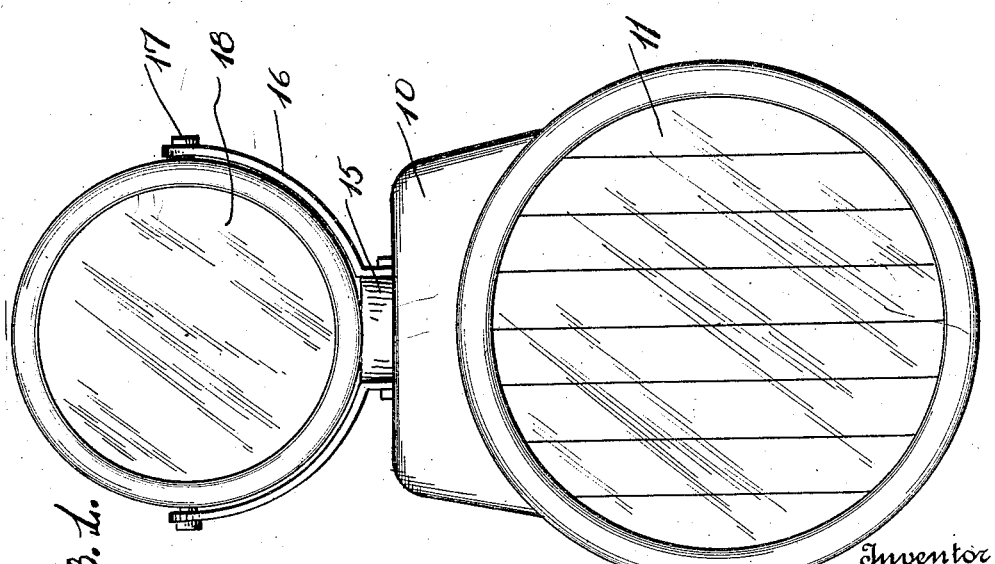

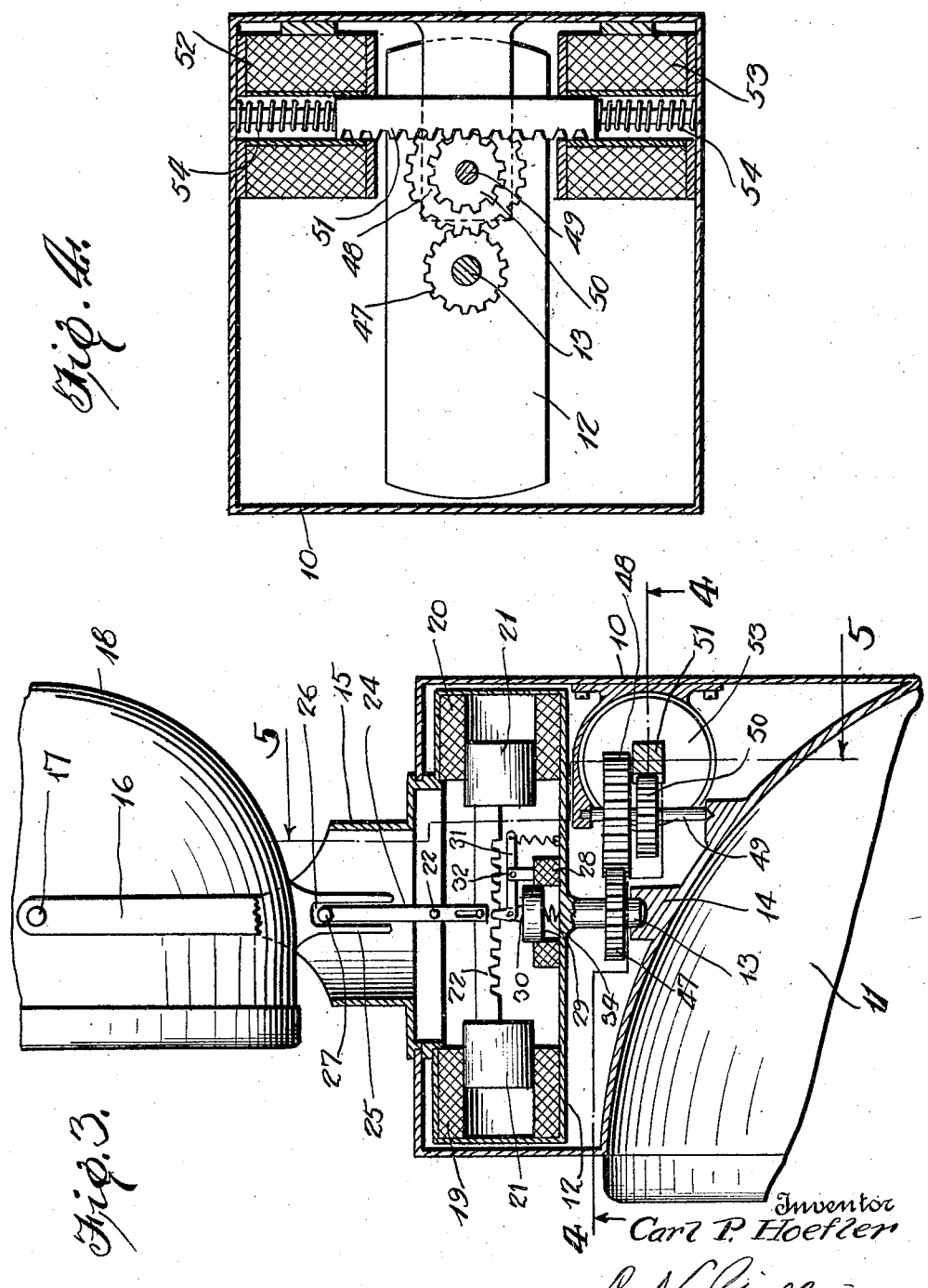

1,686,452

UNITED STATES PATENT OFFICE.

CARL PERRY HOEFLER, OF SYRACUSE, NEW YORK.

HEADLIGHT.

Application filed September 20, 1926, Serial No. 136,601. Renewed March 6, 1928.

This invention relates to head lights such as are used on automobiles and other like vehicles and more particularly relates to a tilting and swinging headlight.

One important object of the present invention is to provide an improved general construction of tilting and swinging headlight capable of being positioned on any desired part of an automobile by slight changes in the form of its supporting casing.

A second important object of the invention is to provide an improved arrangement of such a headlight, the arrangement being such that the headlight may be swung on a vertical axis while in any position of tilt on a horizontal axis or may be tilted on a horizontal axis while swung in any position on its vertical axis.

A third important object of the invention is to provide an improved electrical mechanism for operating both the swinging and the tilting of the headlight.

A fourth important object of the invention is to provide an improved switch arrangement adapted to be located on the dash or instrument board of the automobile for controlling the electric mechanism.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a front elevation of the improved headlight showing it in position on top of an ordinary automobile headlight.

Figure 2 is a side elevation thereof.

Figure 3 is an enlarged detail section on the line 3—3 of Figure 1 and showing the headlight operating mechanism.

Figure 4 is a section on the line 4—4 of Figure 3.

Figure 5 is a section on the line 5—5 of Figure 3.

Figure 6 is a face view of one form of switch arrangement adapted for use with this invention.

Figure 7 is a wiring diagram of the device.

In the embodiment of the invention here shown there is provided a main casing 10 which has its bottom shaped to seat on the usual automobile headlight 11. Obviously, the bottom of this casing may be shaped to fit any other part of the automobile to which it is desired to apply the improved headlight. It will also be obvious that the usual headlight may be replaced by the improved arrangement or, in other words, the main headlights may have the improved tilting and swinging features applied thereto.

Within the main casing is a supplemental casing 12 forming a turnable device, the casing being supported on a spindle or shaft 13 having a conical lower end seated in a bearing 14. Carried by the top of the casing 12 is a sleeve 15 which passes through a suitable opening in the top of the casing 10 and thus forms an upper journal for the casing 12. Extending upwardly and outwardly from the upper part of this sleeve is a pair of arms 16 forming a fork and in the upper ends of these arms are mounted the horizontally alined journals 17 of an ordinary headlight casing 18 which is thus mounted for tilting movement on a horizontal axis.

The electrical tilting mechanism will now be described. At each end of the casing 12 there is provided a solenoid, these solenoids being indicated at 19 and 20 respectively. Each of these solenoids is provided with a core 21 and these cores are connected by a rack bar 22 having teeth on its under side the cores 21 and bar 22 constituting a core bar. Pivoted on a shaft or spindle 23 is an upright lever 24 having its lower arm connected pivotally by a pin and slot connection to the rack bar 22. Depending from the bottom of the lamp casing 18 is a laterally spaced pair of fingers 25 between which extends the upper arm of the lever 24, the fingers being each provided with a slot 26 for the reception of one end of the cross pin 27 carried by the upper arm of said lever. Mounted on the bottom of the casing 12 is a solenoid 28 having its axis vertical and provided with a core 29 which is connected by a link 30 with an arm 31 pivoted at one end to a bracket 32 carried by the solenoid 28 and provided at its other end with a tooth 33 normally engaging between two of the teeth of the rack bar and thereby preventing its movement until released. The core 29 is normally held raised by a spring 34.

Referring now to Figures 6 and 7 it will be seen that there is indicated an ordinary battery 35 such as is common to automobiles and one terminal of each solenoid 19, 20 and 28 is connected to one pole of this battery by respective wires 36, 37 and 38. At 39 is a switch arm which is connected to the other pole of the battery and on each side of the switch arm is a pair of contacts two of which 40 are in the form of arcuate plates while the other two are button contacts 41 and 42. The contacts 40 are bussed together by a bus member 43 connected to the remaining terminal of the solenoid 28 by a wire 44. The buttons 41 and 42 are connected by wires 45 and 46 respectively to the remaining terminals of the solenoids 19 and 20.

If, now, the switch arm 39 be moved to the right it will first engage the right hand plate 40 and then the button 42. Consequently a circuit will first be established from the battery 35 through arm 39, contact 40, bus 43, wire 44, solenoid 28 and wire 37 back to the battery. Solenoid 28 will thereby be energized and tooth 33 disengaged from the rack bar. Next a parallel circuit will be established from the battery 35 through arm 39, contact 42, wire 46, solenoid 20 and wire 38 back to the battery. Solenoid 20 will thus be energized, the bar 22 moved to the right and the lamp 18 tilted upwardly. Similarly, if moved to the left, arm 39 will act to establish parallel circuits first releasing the tooth and then moving bar 22 to the left thus tilting the lamp downwardly. Of course the solenoids will be de-energized upon placing the arm in the neutral or "off" position and the tooth will engage the rack bar 22 and hold the lamp in whatever position it may be. The cores 21 may be made to fit their solenoids so closely as to produce a dash pot effect and thus slow up the action of the solenoids so that the lamp may be stopped at any desired angle of tilt.

The swinging mechanism for directing the beam of the lamp to the right or left will now be considered. On the shaft 13 is fixed a gear 47 wherewith meshes a gear 48 fixed upon a shaft 49 suitably journalled in the casing 10. On the shaft 49 is also a small gear 50 which meshes with a rack bar 51 forming a core for spaced solenoids 52 and 53 fixed in said casing, the rack bar being normally held centrally of said solenoids by springs 54. One terminal of each of these solenoids is connected in multiple by a wire 55 with one pole of the battery 35. The other terminal of each of these solenoids is connected with a side of an ordinary single pole double throw switch having an arm 56 and contact buttons 57 and 58. The arm 56 is connected to the remaining terminal of the battery by a wire 59 while the buttons 57 and 58 are connected to the remaining terminals of the solenoids 52 and 53 by wires 60 and 61 respectively.

If now the arm 56 be moved to the right to contact with button 58 current will flow from battery 35 through wire 55, arm 56, contact 58, wire 61, solenoid 53, and wire 55 back to the battery. This will energize solenoid 53 and move bar 51 to the right thereby swinging the lamp in a corresponding direction. Similarly moving the arm 56 to contact with button 57 will cause swinging of the lamp to the left. It will be noted that when the arm 56 is in "off" position the springs 54 will restore the lamp to straight ahead position.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a device of the kind described, a supporting member including a yoke, a lamp pivoted in said yoke for tilting movement, a pair of alined and spaced solenoids carried by said member, a core bar adjustable longitudinally in accordance with the energization of respective solenoids, a lever mechanism connecting the bar and the lamp to tilt the latter as the bar moves, releasable means to hold the bar in adjusted position, a third solenoid operatively connected to said means to release the same upon energization, and means to effect successive energization of the third solenoid and a selected solenoid of the first pair.

2. In a device of the kind described, a supporting member including a yoke, a lamp pivoted in said yoke for tilting movement, a pair of alined and spaced solenoids carried by said member, a core bar adjustable longitudinally in accordance with the energization of respective solenoids, a lever mechanism connecting the bar and the lamp to tilt the latter as the bar moves, releasable means to hold the bar in adjusted position, a third solenoid operatively connected to said means to release the same upon energization, and means to effect successive energization of the third solenoid and a selected solenoid of the first pair; in combination with means for supporting said member for rotation, and means for rotating said member.

3. In a device of the kind described, a supporting member including a yoke, and a hollow base supporting the yoke and constituting a receptacle for lamp tilting means, a lamp pivoted in said yoke for tilting movement, a pair of alined and spaced solenoids carried by said member, a core bar adjustable longitudinally in accordance with the energization of respective solenoids, a lever mechanism connecting the bar and the lamp to tilt the latter as the bar moves, and means to energize said solenoids selectively; in combination with means for supporting said member for rotation, a pair of spaced and alined solenoids, a rack bar forming a core for said solenoids, springs normally holding the rack bar centrally of the solenoids, gearing connecting the rack bar and supporting member to rotate the member as the rack bar moves, and means to effect selective energization of said last solenoids.

4. In a device of the kind described, a supporting member including a yoke, a lamp pivoted in said yoke for tilting movement, a pair of alined and spaced solenoids carried by said member, a core bar adjustable longitudinally in accordance with the energization of respective solenoids, a lever mechanism connecting the bar and the lamp to tilt the latter as the bar moves, means to energize said solenoids selectively, and means to hold the bar releasably in adjusted position; in combination with means for supporting said member for rotation, a pair of spaced and alined solenoids, a rack bar forming a core for said solenoids, springs normally holding the rack bar centrally of the solenoids, gearing connecting the rack bar and supporting member to rotate the member as the rack bar moves, and means to effect selective energization of said last solenoids.

5. In a device of the kind described, a supporting member including a yoke, a lamp pivoted in said yoke for tilting movement, a pair of alined and spaced solenoids carried by said member, a core bar adjustable longitudinally in accordance with the energization of respective solenoids, a lever mechanism connecting the bar and the lamp to tilt the latter as the bar moves, releasable means to hold the bar in adjusted position, a third solenoid operatively connected to said means to release the same upon energization, and means to effect successive energization of the third solenoid and a selected solenoid of the first pair; in combination with means for supporting said member for rotation, a pair of spaced and alined solenoids, a rack bar forming a core for said solenoids, springs normally holding the rack bar centrally of the solenoids, gearing connecting the rack bar and supporting member to rotate the member as the rack bar moves, and means to effect selective energization of said last solenoids.

In testimony whereof I affix my signature.

CARL P. HOEFLER.